United States Patent
Chou et al.

(10) Patent No.: US 7,249,011 B2
(45) Date of Patent: Jul. 24, 2007

(54) METHODS AND APPARATUS FOR AUTOMATIC TRAINING USING NATURAL LANGUAGE TECHNIQUES FOR ANALYSIS OF QUERIES PRESENTED TO A TRAINEE AND RESPONSES FROM THE TRAINEE

(75) Inventors: Wu Chou, Basking Ridge, NJ (US); George W. Erhart, Pataskala, OH (US); Valentine C. Matula, Granville, OH (US); Daniel J. Sinder, Caldwell, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 996 days.

(21) Appl. No.: 10/217,177

(22) Filed: Aug. 12, 2002

(65) Prior Publication Data

US 2004/0030541 A1 Feb. 12, 2004

(51) Int. Cl.
G06F 17/28 (2006.01)
(52) U.S. Cl. .................. 704/2; 270/270.1; 270/231; 270/258
(58) Field of Classification Search .................. 704/2, 704/270, 231–257, 258
See application file for complete search history.

(56) References Cited

U.S. PATENT DOCUMENTS

| 4,468,204 A | 8/1984 | Scott et al. | |
| 5,293,584 A | 3/1994 | Brown et al. | |
| 5,311,422 A * | 5/1994 | Loftin et al. | 703/2 |
| 5,503,560 A | 4/1996 | Steniford | |
| 5,540,589 A | 7/1996 | Waters | |
| 5,615,296 A | 3/1997 | Stanford et al. | |
| 5,634,086 A | 5/1997 | Rtischev et al. | |
| 5,727,950 A | 3/1998 | Cook et al. | |
| 5,823,788 A | 10/1998 | Lemelson et al. | |
| 5,864,844 A * | 1/1999 | James et al. | 707/4 |
| 5,870,709 A | 2/1999 | Bernstein | |
| 5,978,648 A | 11/1999 | George et al. | |
| 6,134,529 A | 10/2000 | Rothenberg | |
| 6,160,987 A | 12/2000 | Ho et al. | |
| 6,173,266 B1 | 1/2001 | Marx et al. | |
| 6,198,739 B1 * | 3/2001 | Neyman et al. | 370/353 |
| 6,224,383 B1 | 5/2001 | Shannon | |
| 6,594,355 B1 * | 7/2003 | Deo et al. | 379/219 |
| 2002/0019737 A1 * | 2/2002 | Stuart et al. | 704/275 |
| 2003/0126136 A1 * | 7/2003 | Omoigui | 707/10 |
| 2003/0156706 A1 * | 8/2003 | Koehler et al. | 379/265.05 |

* cited by examiner

Primary Examiner—Richemond Dorvil (57) ABSTRACT

Techniques for training a call center operator trainee are described. A database contains queries including caller speech providing information to be used in routing a call. Each query is associated with an operator response as well as numerical values produced by analyzing the query and the operator response. A training module presents a query to a trainee and receives the trainee response. The training module compares the trainee response to one or more of the numerical values in the database to determine if the trainee response is consistent with the correct destination for the call. If the trainee response is not consistent with the correct destination, the training module provides guidance to assist the trainee in associating the query with the correct destination.

17 Claims, 4 Drawing Sheets

METHODS AND APPARATUS FOR AUTOMATIC TRAINING USING NATURAL LANGUAGE TECHNIQUES FOR ANALYSIS OF QUERIES PRESENTED TO A TRAINEE AND RESPONSES FROM THE TRAINEE

FIELD OF THE INVENTION

The present invention relates generally to training in the proper interpretation of and response to spoken commands or requests. More particularly, the invention relates to an automatic trainer for presenting queries or other verbal information to a trainee, receiving and analyzing responses from the trainee, identifying whether the trainee responses to the verbal information is appropriate and providing appropriate guidance to the trainee when trainee response does not show an understanding of the query.

BACKGROUND OF THE INVENTION

Interpretation of spoken or other verbal requests or instructions is an important function in the operations of many organizations. Organizations often require employees to handle spoken requests, often from customers who may not phrase the requests in any standard way. Training of these employees often includes presenting sample requests to the employees, observing the employee's response to the requests, determining if the employee has responded correctly and giving guidance to the employee if the response is incorrect. Such training often requires a human trainer to present the sample requests and evaluate the employee's response. The use of a human trainer imposes costs for the labor of the trainer.

One specific activity which requires training in the interpretation of spoken or other verbal instructions is routing of telephone calls to an organization. Most calls received by a large enterprise or service center are then transferred from a centralized telephone number through the operation of a call center. Calls to the centralized telephone number are answered by an automated call router or a human operator. The incoming calls are then routed to a destination based on information received from the customer, such as a touchtone entry, a statement of the call destination, a description of activities or services to which the call relates, or a more generalized statement of the issue which the customer wishes to address. A skilled human operator can discern a caller's intentions even if they are expressed in indirect ways, but an operator must be trained in order to route calls successfully.

Frequently, call centers often experience a high degree of turnover among their human operators. A continuous influx of new operators leads to a continuous need to train these new operators. Typically, training of call center operators is performed by human instructors. A human instructor can present a query to an operator trainee, interpret the trainee's response, and determine whether or not the trainee's response is correct. If the trainee operator's response is not correct, the instructor can point out that the response is not correct and can furnish guidance about which elements of the query indicate the correct destination of the call.

However, the labor costs associated with the use of human trainers constitutes a major element of operating costs for a call center. Moreover, it may be difficult for the call center to provide training quickly enough to keep pace with the influx of new operator trainees. It would be desirable to be able to train call center operators or other persons required to interpret spoken requests and other verbal information using an automated system which could present a query to a trainee, identify the trainee's response as correct or incorrect and provide guidance to the trainee if the trainee's response was incorrect.

SUMMARY OF THE INVENTION

A training system according to an aspect of the present invention performs automated training of an trainee, such as an operator trainee, by presenting verbal information, such as simulated calls, to the trainee. In the case of simulated calls to an operator trainee, each simulated call includes a query comprising speech typical of that made by a person telephoning a call center and speaking with the call center operator in order to have the call directed to the desired destination. The training system receives the trainee response to the query and analyzes the trainee response to determine if it is consistent with routing a call to the destination indicated by the query. The training system may suitably employ a database constructed by creating a set of entries, each comprising speech from a caller to an operator and the response of the operator to the caller, along with values produced by analyzing the query and the response. These values may suitably include a stored response vector containing numerical values derived from key words in the operator response. The values contained in the stored response vector may then be used to identify a destination indicated by the response. Each entry may also suitably include a query vector containing numerical values derived from key words in the query. The values contained in the query vector may be used to identify a destination indicated by the query. The database may also include a set of destination documents, one for each possible destination to which a call may be routed. Each destination document includes numerical values derived from the content of calls routed to that destination.

The system may suitably include a trainee interface to allow communication with the trainee. The trainee interface preferably includes a text to speech converter and accompanying hardware for presenting verbal information and instructions to the trainee, as well as a speech to text converter and accompanying hardware for receiving trainee responses. The trainee interface also preferably includes a monitor, keyboard or other user interface devices for providing direction to the trainee and receiving trainee instructions.

The system preferably includes a training module which presents queries to the trainee, receives the trainee's responses and evaluates the trainee's responses to determine if the trainee has performed routing correctly. The training module retrieves an entry from the database, presents it to the trainee and receives the trainee's response. The training module then processes the trainee's response to create a trainee response vector. The training module compares the trainee response vector against the stored response vector associated with the query. The training module may also compare the trainee response vector against the destination documents and use the query destination tag to determine if the destination document most closely matching the trainee response vector is associated with the correct destination.

If the trainee response vector is consistent with the stored response vector or the destination document, the trainee has routed the call correctly. The training module may then choose another entry for presentation to the trainee. If the trainee has not performed routing correctly, the training module provides guidance to the trainee, listing key words present in the query or identifying and pointing out specific key words which distinguish the query from similar queries.

A more complete understanding of the present invention, as well as further features and advantages of the invention, will be apparent from the following Detailed Description and the accompanying drawings.

DETAILED DESCRIPTION

Figure 1:
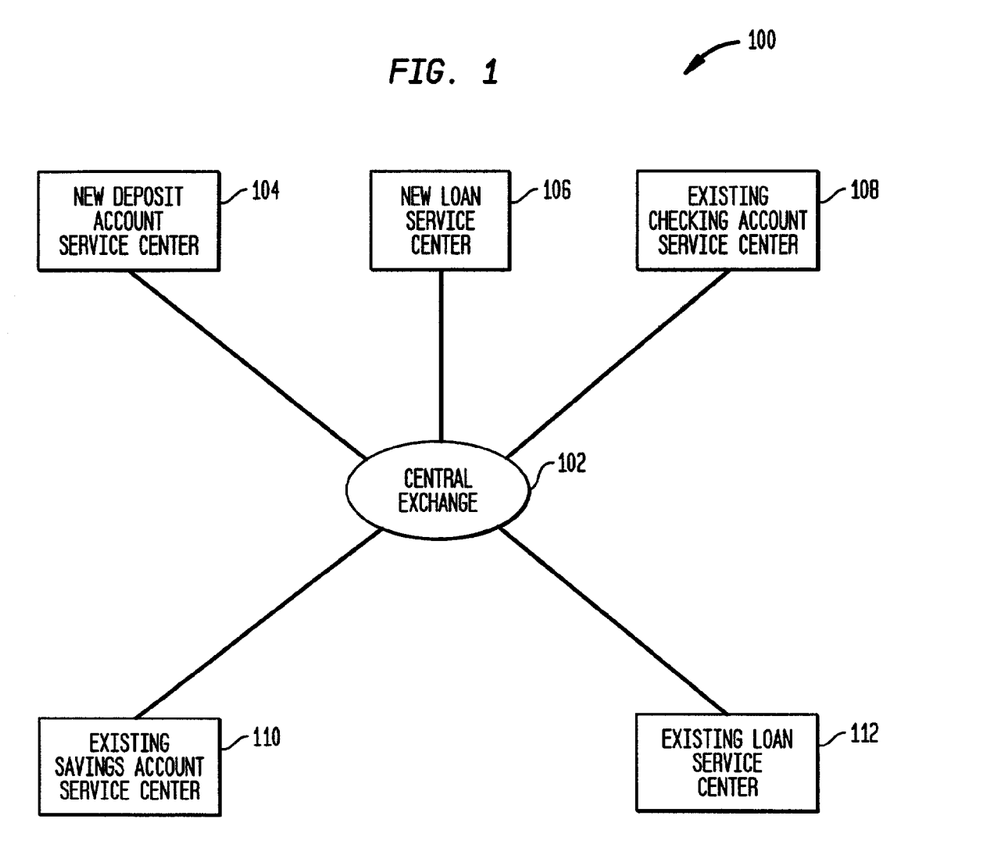
FIG. 1 illustrates a call center that may suitably employ a training system according to the present invention.

FIG. 1 illustrates an exemplary call center 100 employing a human operator to route calls. The techniques of the present invention may be employed in training this operator. The call center 100 includes a central exchange 102 at which the human operator receives calls and performs routing of calls. The call center 100 also includes a number of customer service centers to which calls may be routed, including a new deposit account service center 104, a new loan service center 106, an existing checking account service center 108, an existing savings account service center 110 and an existing loan service center 112. When a call is received at the central exchange 102, the operator speaks with the customer, listens to the customer's request and rout the call to the appropriate one of centers 104-112. While routing the call, the operator may make remarks to the customer indicating which of the centers 104-112 the call is being routed to.

For example, a customer may call the center 102 with the request "I want to speak with someone about my checking account." This call should be routed to the existing checking account service center 108, because the terms "checking account" indicate that the request concerns a checking account and the term "my" indicates that the customer already has a checking account. The operator should route the call to the center 108, with or without an accompanying remark to the customer indicating the destination to which the call should be routed. The techniques of the present invention may be used to train an operator to route calls according to customer requests, or to train a trainee to interpret other verbal information.

For example, the query "I want to speak to someone about my checking account" may be presented to a trainee. This and other queries, as well as numerical information identifying the call destinations indicated by each query, have previously been stored in a database. The trainee responds to the query, either by a verbal remark indicating the destination to which the call is being routed or by making a keypad or other entry simulating routing the call. The trainee response is received and interpreted to determine whether the trainee has routed the call to the correct destination. If the call has been routed to the correct destination, the trainee is so informed. If the call has not been routed to the correct destination, the trainee is informed that the response is incorrect. The significant words in the query may be recited to the trainee.

Figure 3:
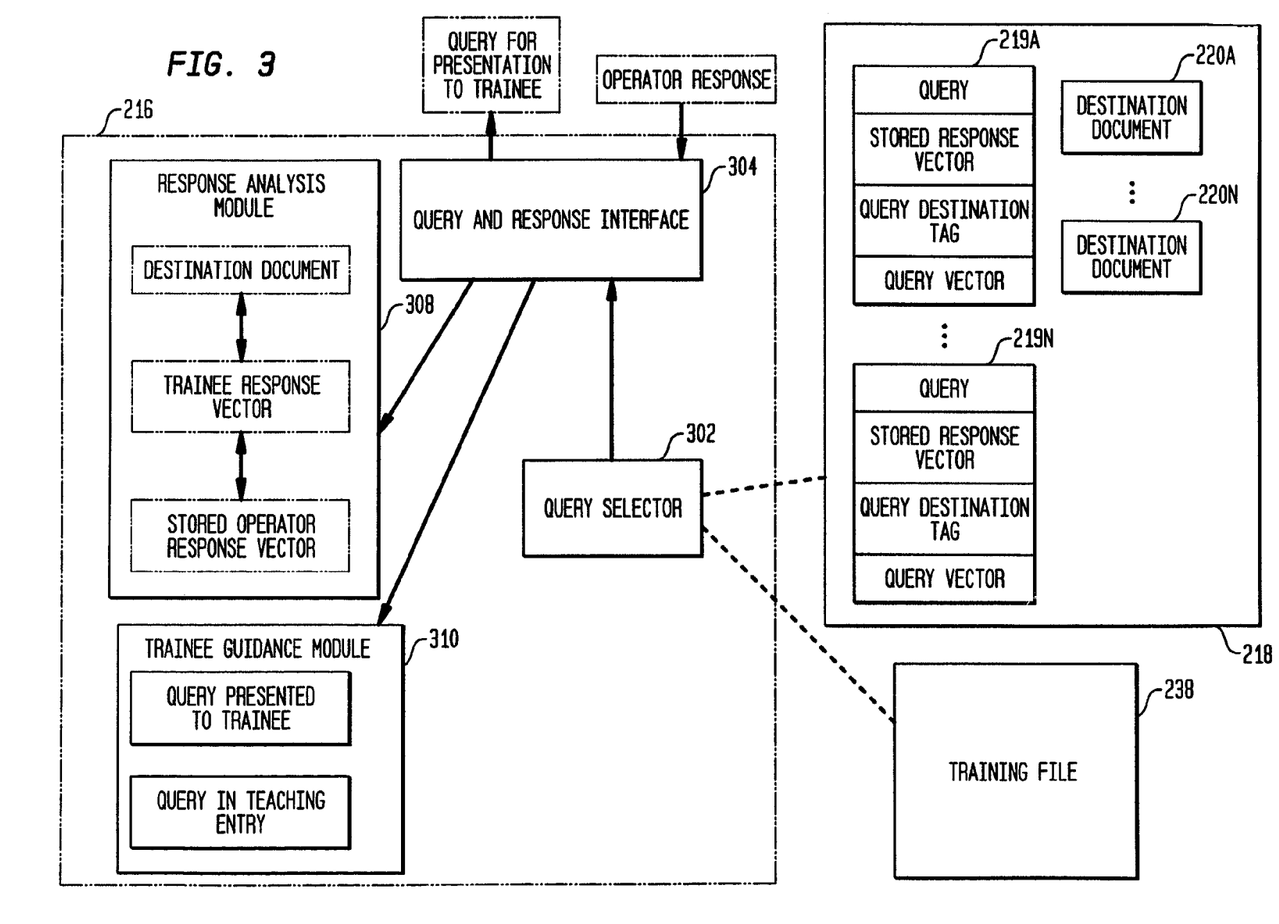
FIG. 3 illustrates a training module according to the present invention.
Figure 4:
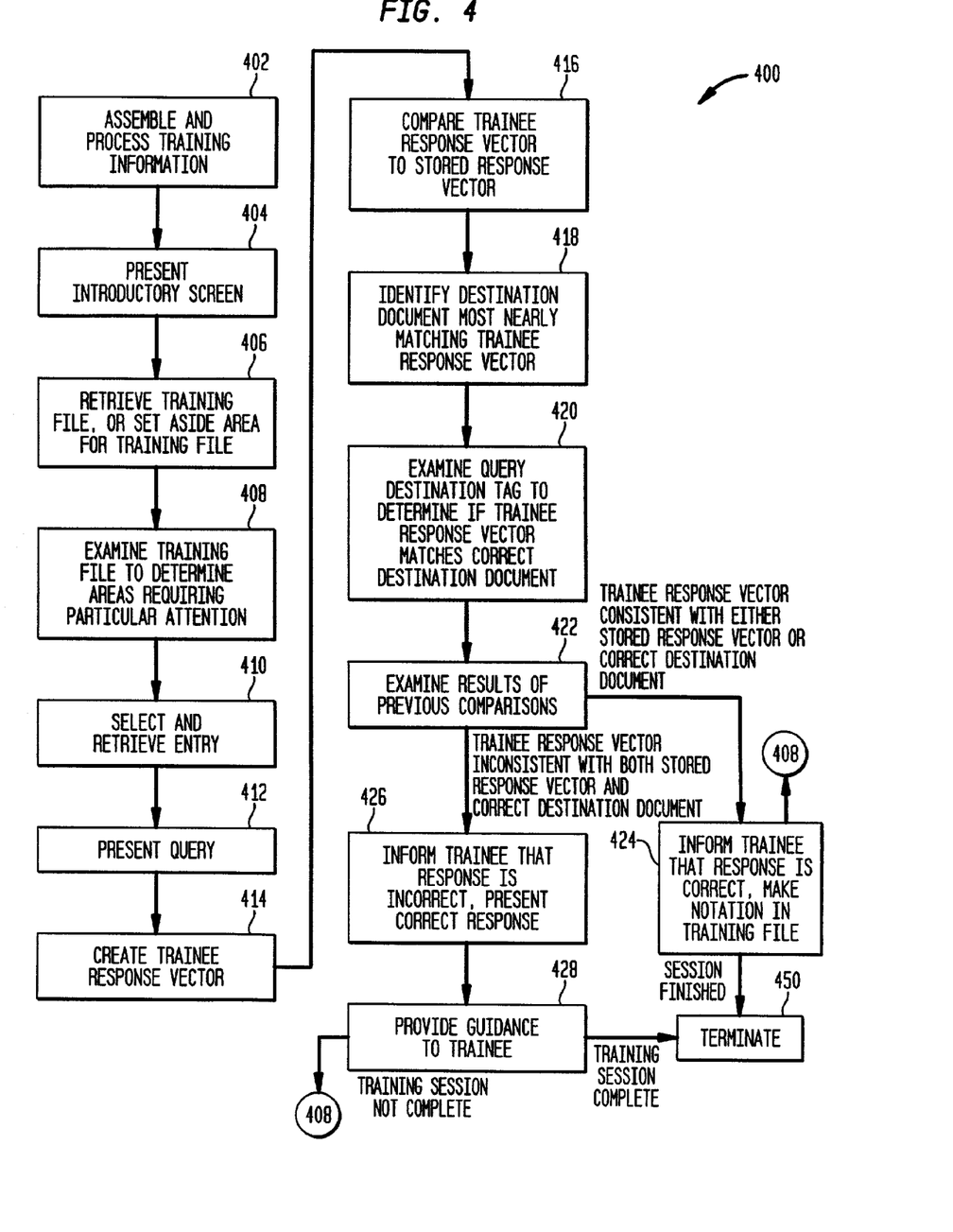
FIG. 4 illustrates a process of automated operator training according to the present invention.

Alternatively, the query which evoked the response, in this case, "I want to speak to someone about my checking account," may be compared to other similar queries associated with the destination to which the trainee actually routed the call. For example, the trainee may have routed the call to the new deposit account center 104. This would be appropriate in response to the query "I want to speak to someone about a checking account," but the word "my" in the query presented to the trainee indicates that the query relates to an already existing checking account. The actual query and the nearest query leading to a response matching the trainee's actual response are examined to identify their distinguishing characteristics, and the distinguishing words are presented to the trainee. In this case, the word "my" distinguishes between a new and an existing account. Details of the design and operation of a training system according to the present invention are illustrated in FIGS. 2-4 and described below.

Figure 2:
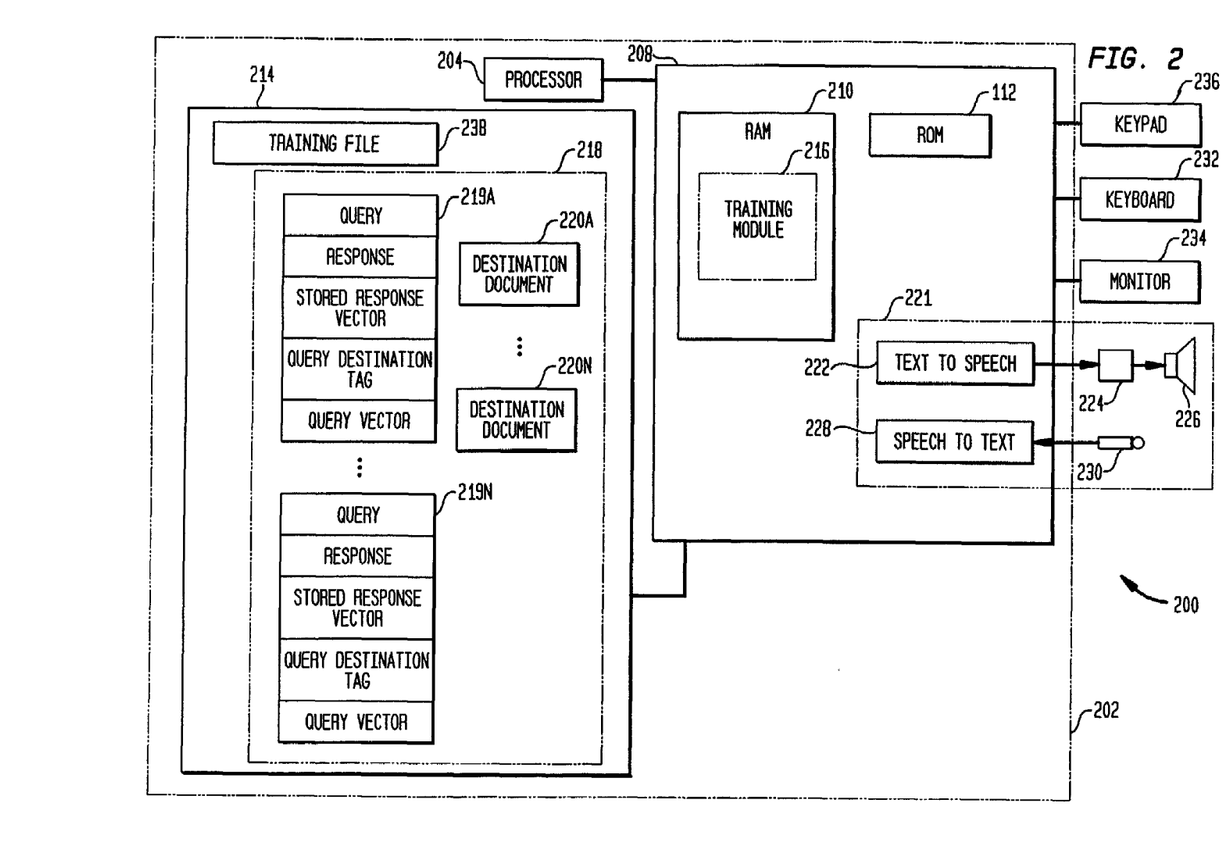
FIG. 2 illustrates an automated training system 100 according to an aspect of the present invention.

FIG. 2 illustrates an automated training system 200 according to an aspect of the present invention. The exemplary system 200 is described in terms of training a call center operator in the routing of calls, but it will be recognized that the techniques described herein may be applied to any system of training a human agent in the proper interpretation of and response to verbal information.

The system 200 includes a computer 202, including a processor 204 and memory 208. The memory 208 includes RAM memory 210 and ROM memory 212, as well as a disk drive 214.

The computer 202 hosts a training module 216, which is preferably a software application stored on the disk drive 214 and moved into the RAM memory 210 as needed for execution by the processor 202. The training module 216 has access to a training information database 218.

The training information database 218 includes a set of entries 219A . . . 219N formed from a collection of customer queries and correct responses from an experienced agent. The entries are preferably developed by collecting queries which have been routed to appropriate destinations by experienced operators, along with the responses given by the operators in routing the call.

Each entry preferably includes a query for presentation to the trainee. The query comprises the speech of a customer to an experienced operator. Each entry may also include the response of an experienced operator, comprising spoken comments made to the caller while routing the call. In addition, each entry includes a stored response vector, which is a numerical representation of values of key terms in the operator response. The value of the stored response vector can be used to identify the call destination indicated by the operator response. Each entry may also include a query destination tag, which is an explicit identification of the destination to which the call was routed. The query destination tag may be created, for example, by interpreting keypad entries made by the operator in dialing the correct destination for the call. Each entry may further include a query vector, which is a numerical representation of key terms in the query, and whose value can be used to identify the call destination indicated by the query.

A query is a request or other remark by a customer used by the agent to route the call. A typical query may specify the destination to which the call is to be routed, may describe the subject of the call or may indicate what the customer wishes to do. Examples of queries are "Let me speak to an existing checking account representative," "I want to speak to someone about my checking account," or "I want something done about this overdraft notice I received." Each of these queries would cause the call to be routed to a representative handling inquiries about existing checking accounts, but analysis is required to identify the correct destination.

Successful routing of a call is accomplished by identifying and processing key terms appearing in the query. These terms can be assigned values and used to create a query vector whose value can be used to indicate the destination of a call, for example by comparing the value of the query vector against query vectors known to be associated with particular destinations or against destination documents associated with various destinations. The training information database includes destination documents 220A . . . 220N, one destination document for each destination to which a call may be routed.

The system 200 also includes a text-speech interface 221, including text to speech converter 222, a speech synthesizer 224, a speaker 226, a speech to text converter 228, and a microphone 230. The text to speech converter 222 and the speech to text converter 226 may be separate hardware devices, or alternatively may be implemented as software running on the computer 202. The text-speech interface 221 allows the system 200 to communicate with a trainee by receiving the trainee's speech using the microphone 230, converting the trainee's speech to text which can be processed in order to extract key terms and other information used to identify the destination to which the trainee proposes to route the call.

The interface 220 also allows the system 200 to present queries and give instructions and feedback to a trainee through simulated speech utterances, produced using the text to speech converter 222 and the speech synthesizer 224 and played to the trainee using the speaker 226. The system 200 also preferably includes a keyboard 232 and monitor 234 to allow the trainee additional avenues of communication with the system 100, as well as a telephone keypad 236. The telephone keypad 236 allows the trainee to perform simulated operations, such as simulating the actual transfer of a call to a destination by making appropriate entries on the keypad 236. The system 200 is able to determine which entries the trainee makes using the keypad 236, in order to determine whether or not the operator has performed the correct action as indicated by the query. Alternatively, a trainee may make text entries to queries using the keyboard 232.

In order to begin a training session, the trainee preferably invokes the training module 216, which presents an introductory screen using the monitor 234. The introductory screen allows the trainee to identify himself or herself to the system, suitably by entering a username or other identifying information. Identifying the trainee allows the system 200 to create a separate training file, such as the training file 238, for each trainee. Alternatively, a single file may be used to store training results for all trainees, with a specific area of the file associated with a particular trainee or with information related to a particular trainee identified in some other way. The use of a training file, or information within a training file, identified with a particular trainee allows storage of training session results, such as trainee responses and trainee errors, in order to adapt future training sessions to the needs of the trainee. If desired, the trainee may also be required to submit a password along with the username, in order to provide assurance that the trainee accessing the system 200 is in fact the trainee whose username was entered.

Once the trainee has been identified, the training module 216 may suitably present various training options to the trainee in order to allow the trainee to choose the length of the training session, the number of queries to be presented in the training session, or other choices which the training module 216 may be designed to allow. After the various choices are made, the training session begins. Additional details of the training module 216 and its use in a training session are illustrated in FIG. 3 and discussed below.

FIG. 3 illustrates further details of the training module 216, as well as the training file 238 and the database 218. The training module 216 includes a query selector 302. The query selector 302 selects entries from the database 218 for presentation to the trainee. The training module 216 suitably selects one entry at a time for presentation of a query and processing and evaluation of a trainee response. A query is chosen and presented to the trainee and the trainee's response is received and evaluated, and feedback is given to the trainee about whether his or her response is correct and how to improve his or her response. The query selector 302 may suitably choose entries at random or, alternatively, may examine the training file 138 to identify areas in which the trainee needs additional instruction, so that entries can be selected which will provide instruction in those areas. For example, queries may be chosen which are similar to those which have presented difficulty to the trainee in the past.

The training module 216 also includes a query and response interface 304. The query and response interface 304 passes queries to the text to speech converter 222 for presentation to the trainee and receives text representations of the trainee responses from the speech to text converter 228. After the query selector 302 has chosen a query, the query is passed to the query and response interface 304 and from there to the text to speech converter 222. The text to speech converter performs text to speech conversion to produce speech that may be played to the trainee by the synthesizer 224 and the speaker 226. The trainee then responds, for example by giving an oral response which is processed by the speech to text converter 228 and passed to the query and response interface 304, or alternatively by making a text entry using the keyboard 232 or simulating a call transfer using the keypad 236. The query and response interface 304 passes the response to a response analysis module 308.

After receiving the trainee response, the response analysis module 208 analyzes the trainee response to determine the call destination indicated by the trainee response. If the trainee has made an entry using the keypad 236, the response analysis module 208 simply compares the response against the correct destination. However, if the trainee has made a speech entry or has entered text using the keyboard 236, the response analysis module 208 analyzes the trainee response in order to determine the destination indicated by the response. In such a case, the trainee response can be expected to be a phrase indicating the destination to which the call is to be transferred. To take a specific example, a trainee may respond to the query "I want to talk to someone about my checking account" with the response "I will transfer you to the deposit account service center."

In order to determine the call destination indicated by the trainee response, the response analysis module 308 analyzes the trainee's response by examining the response for key terms, and analyzing and processing the key terms to create a trainee response vector. A trainee response vector is a vector indicating the destination identified by the key terms in the trainee's response. It is relatively easy for the response analysis module 308 to create the trainee response vector from the trainee's response, because the key terms in the trainee's response can be expected to explicitly identify the destination to which the trainee proposes to transfer the call.

In the above example, the key terms are "checking," "account," "services," "checking+account," "account+services" and "checking+account+services". The trainee response vector "checking account services" is created by processing these key terms. This destination vector is then compared to the stored operator response vector associated with the query. It will be remembered that the stored operator response vector is created by extracting and processing key terms appearing in the actual response given by an experienced agent in routing a call based on the query which has been presented. If the trainee response vector is consistent with the stored operator response vector, the trainee has given a correct answer and the training module 216 informs the trainee that the answer is correct.

In order to determine if the trainee has routed the call correctly, the trainee response vector is preferably compared with the stored operator response vector rather than the query vector. The reason for this is that operator responses typically differ from customer queries. Operator responses tend to conform to a limited number of formats and tend to specifically describe the call destination. Customer queries may have a much wider range of forms and contain a much wider variety of information, and need not specifically describe the call destination. The customer query may recite the call destination, but it may alternatively describe the customer's needs or what the customer wishes to accomplish. The trainee response, especially a correct trainee response, will typically be much more closely focused on the actual destination to which the call is to be routed and may not closely match the query.

As an additional check, the trainee response vector may also be compared with the destination documents 220A . . . 220N to determine which of the destination documents 220A . . . 220N best matches the trainee response vector. A destination document for a particular destination is created by collecting all key terms in operator responses in which a call is routed to the destination. Each term is given a value indicating how frequently it appears, and a matrix is created using the frequencies of the various terms.

In order to compare the trainee response with the destination document, the trainee response vector is compared with the destination documents, shown here as documents 220A . . . 220N. Techniques of vector space based semantic analysis which are known in the art of natural language call routing are used to compare the trainee response vector with the destination documents. Details of such techniques can be found in C.H. Lee, R. Carpenter, W. Chou, J. Chu-Carroll, W. Reichi, A. Saad, Q. Zhou, "A Study on Natural Language Call Routing", *Speech Communication*, Vol 31, (4), pp 309-320, 2000, and W. Chou, Q. Zhou, H.J. Kuo, A. Saad, D. Attwater, P. Durston, M. Farrell, F. Scahill, "Natural Language Call Steering for Service Applications", *Proceedings, International Conference on Speech and Language Processing*, Vol IV, Beijing, 2000, which are incorporated herein by reference in their entirety.

The destination indicated by the trainee response is deemed to be the destination associated with the destination document most closely matching the trainee response vector. The query destination tag included in the entry is examined to determine if it matches the destination indicated by the trainee response vector. If the trainee response vector is consistent with the destination indicated by the query destination tag, the trainee will be deemed to have routed the call to the correct destination. Comparing the trainee response with the destination document allows the trainee response to be identified as correct even if the trainee response vector differs from the stored operator response vector, for example because of variations in the phrasing used by the trainee.

Alternatively, it is possible for the trainee to enter a nonverbal response, for example by entering the telephone number for the correct destination by using the keypad 236. Such a nonverbal response may be accompanied by a general verbal comment such as "I'll connect you." In this case, the nonverbal response is interpreted and compared to the query destination tag in order to identify the destination indicated by the response.

If the trainee response, whether indicated by a trainee response vector or by interpretation of a nonverbal response, indicates the correct destination, a trainee guidance module 310 prepares a message notifying the trainee that the response is correct. The query selector 302 then selects another query and the process of presenting the query to the trainee and receiving and analyzing the trainee's response is repeated.

If the trainee response is not consistent with the stored operator response vector, the trainee guidance module 310 notifies the trainee that the answer is incorrect. The trainee guidance module 310 also provides guidance to the trainee in order to help the trainee understand how to route the call correctly. The trainee guidance module 310 may suitably identify for the trainee significant key terms contained in the customer query. These terms are those used to construct the query vector. The key terms in the query vector are preferably ordered according to their disambiguating power, for example with the term having the greatest disambiguating power appearing first in the list. In such a case, the training module 216 simply retrieves the list of key terms and uses them to provide guidance to the trainee.

Alternatively, it is possible for the trainee guidance module 310 to search for a suitable teaching entry in the database 218. The teaching entry should include a query which would properly be routed to the destination given in the trainee's incorrect response. The trainee guidance module 310 can compare the query in the teaching entry against the query actually presented to the trainee and point out the differences in key terms which lead to the choice of the correct destination over that incorrectly given by the trainee. The teaching entry preferably includes a stored operator response vector similar to the trainee response vector computed from the trainee's response, and also includes a query having a query vector similar to the query vector of the query which was actually presented to the trainee. The trainee guidance module 310 compares the query vector of the teaching entry against the query vector of the actual entry presented to the trainee and points out key terms which differ between the two vectors. Pointing out the differing key terms helps highlight for the trainee the critical difference between the two queries, leading to the choice of one destination over another.

As an example, suppose the query is "I want to talk to someone about my checking account," and the associated destination is a representative handling inquiries about existing consumer loans. The trainee responds, "I will transfer you to new deposit accounts," indicating that the call is to be transferred to the new deposit account service center 104. Transferring the call to the center 104 is incorrect, because the center 104 handles inquiries from prospective customers and does not handle inquiries about existing accounts. The response evaluation module 308 will compare the trainee response vector created from the trainee's response and compare it against a stored response vector produced by an experienced operator. The combination of terms new+deposit+accounts will not appear in the stored response vector, because the correct response will refer to services for existing deposit accounts rather than new accounts.

The response evaluation module 308 will then compare the trainee response vector against the destination documents. The destination document having the closest match to the query is the one pointing to a center for services for existing accounts, rather than the one answering inquiries about new accounts. The response evaluation module 308 will examine the query destination tag belonging to the document most closely recognizing the query "I want to talk to someone about my checking account" and recognize that the query destination tag does not match the destination indicated by the trainee response vector. The response evaluation module 308 will indicate that the trainee response is incorrect and invoke the trainee guidance module 310, so that the trainee guidance module can provide analysis of the trainee response and guidance for the trainee on why the trainee's response differs from the correct response.

The trainee guidance module 310 may suitably instruct the trainee that his or her response is incorrect, may notify the trainee that the correct destination is the existing checking account service center 108 and may list the key terms "my," "checking," and "account" as important key terms to use in identifying the destination. The terms "checking" and "account" help to identify the inquiry as related to a loan, and the term "my" helps to identify the inquiry as related to an existing account.

Alternatively, the training module 216 may inform the trainee of the correct destination, and key terms to consider in identifying the correct destination. For example, in response to the trainee's response, the trainee guidance module 310 may respond with "No, it is an existing checking account and the call should be transferred to the existing checking account service center. The term 'my' indicates that the account is an existing account."

This response is created by first identifying the nature of the error. The analysis of the trainee's response by the response analysis module 308 indicates that the trainee's response correctly identifies the inquiry as relating to a checking account, and that the area of confusion relates to whether the loan is a new account or an existing account. By comparing the query which was actually presented against a similar query which should be routed to the new account center 104 and which is associated with a response similar to that given by the trainee, the trainee guidance module 310 is able to identify the term "my" as the term in the query which disambiguates between new and existing loans. The trainee guidance module 310 then constructs an appropriate instruction pointing to the term "my" as significant in understanding the proper routing of the inquiry.

The above discussion relates to the case in which the query unambiguously defines a destination. In actual dialogs with callers, operators may encounter queries that incompletely define the destination to which a call should be routed. In such cases, operators should pose questions to the caller in order to solicit additional information in order to correctly route the call. An operator should be able to recognize whether or not a query posed by a caller defines the destination to which the call should be routed. The operator should ask appropriate questions in order to obtain information to route the call properly, but should not ask additional questions if the initial query included sufficient information to allow the call to be properly routed.

In order to provide training for cases in which an operator needs to pose additional questions, the training information database 218 preferably includes a number of query entries including ambiguous queries and information related to those queries. Ambiguous queries present inadequate information for properly identifying a unique call destination. For example, the query "Let me speak to someone about car loans" may be a request relating to services about a new loan or a request relating to services about an existing loan. Therefore, an operator should ask for further detail in order to route the call to the correct destination.

A query may be identified as ambiguous if it has an associated query vector whose match to a first one of the destination documents 220A . . . 220N differs from its match to a second document by less than a predetermined value. Cases may also arise in which a query is ambiguous as to three or more documents, that is, the query fails to uniquely identify one destination among three or more possible destinations.

In such a case, the trainee response should include a question including a term disambiguating the destinations indicated by the destination documents. The stored operator response vector will represent such a question. The response analysis module 308 compares the trainee response vector to the stored operator response vector to determine if the trainee response vector is consistent with the stored operator response vector. A correct response would include an appropriate question containing key terms distinguishing the possible destination documents. For example, a suitable question would be "Is this an existing loan?" Once the trainee responds with an appropriate question, the response analysis module 308 provides an answer and waits for the trainee to provide a response indicating the destination to which the call is to be routed. For example, an answer of "Yes" to the question "Is this an existing loan?" indicates that the proper destination is a department handling inquiries about existing loans. An answer of "No" indicates that the proper destination is a department providing information about new loans.

Once the trainee has indicated the routing of the call, the response is analyzed and processed in a way similar to that described above for responses to unambiguous queries. That is, the response is indicated as correct and a new query is presented, or the response is indicated as incorrect and the trainee guidance module 310 is invoked.

Continuing now with the analysis of the trainee's response to the initial query, if the trainee response is because the trainee has failed to pose a disambiguating question or because the trainee has asked the wrong question, that is, one that will not disambiguate the possible destinations, the response analysis module 308 invokes the trainee guidance module 310, which presents a teaching entry to the trainee, for example explaining that the trainee needs to ask a question in order to distinguish between possible destinations, identifying the key term needed to distinguish between the destinations and presenting an example query to solicit information to distinguish between the destinations.

FIG. 4 illustrates a process 400 of automated operator call routing training according to the present invention. At step 402, a set of training information is assembled and processed. The set of training information may suitably be similar to the database 218 of FIGS. 1 and 2, and suitably includes a plurality of entries, each entry including a query, a stored response, a query vector, and a stored response vector. The set of training information also preferably includes a destination document for each destination. At step 404, in response to a trainee command, an introductory screen is presented to the trainee, allowing the trainee to enter identification information. At step 406, upon entry and authentication of the identification information, a training file containing information relating to previous training sessions for the trainee is retrieved, if such information exists. If no information relating to previous training session exists, storage space is set aside for information relating to training sessions by the trainee.

At step 408, the training file is examined to identify areas where a particular need exists for training. At step 410, the training information is examined and an entry is selected and retrieved based on predetermined criteria. Such criteria may take into account a need to focus on areas showing a particular need for training, a desire to cover a wide variety of queries, a desire to present queries at random, or any other desired criteria. At step 412, the query contained in the retrieved entry is presented to the trainee. At step 414, upon receiving a trainee response, the trainee response is processed to create a trainee response vector. At step 416, the trainee response vector is compared to the stored response vector. At optional step 418, the trainee response vector is compared to the destination documents to identify the destination document most closely matching the trainee response vector, and the trainee response vector is associated with the destination matching that destination document. At step 420, performed if optional step 418 has been performed, the query destination tag is examined to determine if the destination associated with the trainee response vector is the destination identified by the query destination tag. At step 422, the results of the comparisons at step 416 and, if performed, steps 418 and 420, are examined to determine if the trainee response vector is consistent with the stored response vector or with the correct destination document. If the trainee response vector is consistent with either the stored response vector or the correct destination document, the process proceeds to step 424. If the trainee response vector is inconsistent with both the stored response vector and the correct destination document, the process proceeds to step 426.

At step 424, the trainee is informed that the response is correct and an appropriate notation is made in the training file. If the training session is complete, either because a desired number of queries has been presented, a predetermined time has elapsed or the trainee has entered a command to end the training session, the process terminates at step 450. Otherwise, the process returns to step 408.

At step 426, reached if the trainee response is inconsistent with both the stored response vector and the correct destination document, the trainee is informed that the response given is incorrect and the trainee is informed of the correct response. The trainee may suitably be informed of the correct response, suitably be retrieving and presenting the stored response. At step 428, the trainee is given appropriate guidance in order to assist him or her in understanding how to interpret the query that was presented. For example, the trainee may be presented with a list of key words contained in the query. Alternatively, the trainee may be presented with the query that was given along with a similar sounding query which should be routed to the destination indicated by the trainee's response, along with one or more critical key words that serve to distinguish between the queries. If the training session is at an end, the process terminates at step 450, otherwise the process returns to step 408.

While the present invention is disclosed in the context of a presently preferred embodiment, it will be recognized that a wide variety of implementations may be employed by persons of ordinary skill in the art consistent with the above discussion and the claims which follow below.

We claim:

1. A system for training a call center operator, comprising:
a database containing queries for presentation to a trainee, each query comprising speech typical of that spoken by a caller to a call center, the speech providing information intended to guide an operator in routing the call, each query being further associated with stored destination information indicating the destination specified by the query; and
a training module for selecting a query from the database and presenting it to the trainee, the training module being operative to receive a speech response from the trainee, the training module being further operative to interpret the trainee response to determine whether the trainee response indicates the trainee has selected the destination indicated by the destination information and indicate to the trainee whether or not the trainee response is correct.

2. The system of claim 1 wherein the training module provides guidance to the trainee if the trainee has given an incorrect response, the guidance highlighting elements of the query which indicate the destination.

3. The system of claim 2 further comprising a training file storing results of training sessions and wherein the training module includes a query selector operative to examine the training file to identify elements requiring additional training and to select queries based on elements requiring additional training and other predetermined criteria.

4. The system of claim 3 wherein the training module further comprises a query and response interface for presenting queries to the trainee and receiving trainee responses.

5. The system of claim 4 wherein the database includes with each query a stored operator response, a stored response vector, a query destination tag and a query vector, the stored response vector comprising numerical information produced by analyzing an operator response and the query vector comprising numerical information produced by analyzing the query.

6. The system of claim 5 wherein the database further includes a destination document for each possible destination, the destination document for a destination containing numerical information obtained by processing all calls to the destination.

7. The system of claim 6 wherein the training module includes a response analysis module operative to analyze the trainee response to produce a trainee response vector, the trainee response vector comprising numerical information produced by analyzing the trainee response, the response analysis module being also operative to compare the trainee response vector with the stored response vector to determine if the trainee response vector is consistent with the stored response vector, the response analysis module being operative to identify the trainee response as correct if the trainee response vector is consistent with the stored response vector.

8. The system of claim 7 wherein the response analysis module is also operative to compare the trainee response with the destination documents, choose the destination document most closely matching the trainee response, retrieve the examine the query destination tag to determine if the trainee response is most closely matches the destination document associated with the correct destination and identify the trainee response as correct if the trainee response most closely matches the correct destination document.

9. The system of claim 8 wherein the training module further comprises a trainee guidance module operative to provide guidance to the trainee if the trainee response module identifies the trainee response as incorrect, the trainee guidance module being operative to select a list of keywords appearing in the query and present the keywords to the trainee, the keywords being selected depending on their ability to distinguish the destination indicated by the query from other destinations.

10. The system of claim 9 wherein the trainee guidance module is operative to examine the database for a stored response vector similar to the trainee response vector computed for the trainee response, to retrieve the query associated with the stored response vector, to identify keywords distinguishing the query actually presented from the query associated with the stored response vector which has been retrieved and to present the keywords to the trainee.

11. A method of training a call center operator trainee, comprising:
   (a) constructing a database comprising a plurality of entries, each entry comprising speech from a caller to an operator and from an operator to the caller, the speech representing information relevant to a destination to which a call should be routed, the speech from the caller to the operator including a query made by the caller in seeking to inform the operator of the destination to which the call should be routed, the speech from the operator to the caller including a response by the operator informing the caller of the destination to which the operator is routing the call, each entry further comprising numerical values generated by analyzing the speech of the caller and the speech of the operator, the numerical values representing information indicating a destination to which the call should be routed, the numerical values including a query vector produced by analyzing the query and a stored response vector produced by analyzing the operator response as well as a query destination tag identifying the destination indicated by the query, the database further including a destination document for each possible destination to which a call may be routed, the destination document for each destination being produced by analyzing calls routed to that destination;
   (b) selecting an entry including a query for presentation to the trainee;
   (c) presenting the query to the trainee;
   (d) receiving a response from the trainee;
   (e) analyzing the response from the trainee to produce a trainee response vector;
   (f) comparing the trainee response vector to the stored response vector to determine if the trainee response vector is consistent with the stored response vector;
   (g) if the trainee response vector is consistent with the stored response vector, proceeding to step (m);
   (h) if the trainee response vector is not consistent with the stored response vector, comparing the trainee response vector with each destination document to determine which destination document most closely matches the trainee response vector;
   (i) examining the query destination tag to determine if the trainee response vector matches the correct destination document;
   (j) if the trainee response vector matches the correct destination document, proceeding to step (m);
   (k) if the trainee response vector does not match the correct destination document, notifying the trainee that his or her response is incorrect;
   (l) if training is not complete, returning to step b;
   (m) notifying the trainee that his or her response is correct; and
   (n) if training is not complete, returning to step b.

12. The method of claim 11, wherein step (k) is followed by a step of providing guidance to the trainee in order to assist him or her in identifying the destination indicated by the query.

13. The method of claim 12, where each of steps (k) and (m) is followed by a step of storing details of the query presented, the trainee response and the correctness or incorrectness of the trainee response in a training file.

14. The method of claim 13, wherein the step of selecting an entry includes examining the training file to identify areas needing further training and wherein criteria used to select an entry include consideration of which areas need further training.

15. The method of claim 14, where entries stored in the training file during a training session with a particular trainee are associated with that trainee.

16. The method of claim 15, wherein the step of providing guidance to the trainee includes presenting key terms included in the query.

17. The method of claim 15, wherein the step of providing guidance to the trainee includes selecting an entry associated with the destination indicated by the trainee's response, identifying key terms which differ between the selected query and the query actually presented to the trainee and presenting the differing key terms to the trainee.

* * * * *